United States Patent
Ahmed et al.

(10) Patent No.: US 11,334,904 B1
(45) Date of Patent: *May 17, 2022

(54) MANAGEMENT OF REWARDS USING TRANSACTION LISTENING

(71) Applicant: Wells Fargo Bank, N.A., San Francisco, CA (US)

(72) Inventors: Mohammed Ahmed, Newark, DE (US); Robin M. Carter, Bear, DE (US); Megan Collins, Westfield, NJ (US); H. Brock Kolls, Alpharetta, GA (US); Minhthe Luu, Mount Laurel, NJ (US); David Patron, Bethesda, MD (US); Sarah W. Phelps, Annapolis, MD (US); Barry Trexler, Milford, DE (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/211,471

(22) Filed: Mar. 24, 2021

Related U.S. Application Data

(63) Continuation of application No. 16/427,009, filed on May 30, 2019, now Pat. No. 10,963,902, which is a continuation of application No. 15/392,594, filed on Dec. 28, 2016, now Pat. No. 10,346,869.

(51) Int. Cl.
 *G06Q 30/00* (2012.01)
 *G06Q 30/02* (2012.01)

(52) U.S. Cl.
 CPC ............................ *G06Q 30/0226* (2013.01)

(58) Field of Classification Search
 None
 See application file for complete search history.

(56) References Cited

U.S. PATENT DOCUMENTS

| | | |
|---|---|---|
| 6,324,524 B1 | 11/2001 | Lent et al. |
| 7,314,166 B2 | 1/2008 | Anderson et al. |
| 8,346,658 B1 | 1/2013 | Curry et al. |
| 8,903,811 B2 | 12/2014 | Hueter et al. |
| 8,925,802 B1 | 1/2015 | Pletz et al. |
| 8,930,265 B2 | 1/2015 | Blackhurst et al. |
| 9,361,627 B2 | 6/2016 | Chang et al. |
| 9,741,000 B2 | 8/2017 | Kwan et al. |
| 10,122,815 B1 | 11/2018 | Stroebel et al. |
| 2002/0023051 A1 | 2/2002 | Kunzle et al. |

(Continued)

FOREIGN PATENT DOCUMENTS

| | | |
|---|---|---|
| WO | WO-01/18728 A2 | 3/2001 |

OTHER PUBLICATIONS

IP.com NPL Search Strategy (Year: 2021).*

(Continued)

*Primary Examiner* — Matthew T Sittner
(74) *Attorney, Agent, or Firm* — Foley & Lardner LLP

(57) ABSTRACT

Examples described herein relate to apparatus and methods for managing rewards for a customer of a financial institution, including but not limited to, determining a transaction pattern associated with transactions made by the customer, determining a deviation from the transaction pattern, determining an event associated with the customer based on the deviation, and determining rewards that correspond to the event for the customer.

19 Claims, 8 Drawing Sheets

(56) References Cited

U.S. PATENT DOCUMENTS

| | | |
|---|---|---|
| 2004/0049425 A1 | 3/2004 | Bakker et al. |
| 2005/0071238 A1 | 3/2005 | Guillot |
| 2006/0091203 A1* | 5/2006 | Bakker ............... G07F 5/18 |
| | | 235/381 |
| 2006/0161474 A1 | 7/2006 | Diamond et al. |
| 2006/0173772 A1 | 8/2006 | Hayes et al. |
| 2007/0294056 A1 | 12/2007 | Maskall et al. |
| 2009/0276368 A1 | 11/2009 | Martin et al. |
| 2010/0274601 A1 | 10/2010 | Bagwell et al. |
| 2013/0103486 A1* | 4/2013 | Hess ............... G06Q 30/02 |
| | | 705/14.38 |
| 2014/0132623 A1 | 5/2014 | Holten et al. |
| 2014/0164223 A1 | 6/2014 | Grigg et al. |
| 2014/0164224 A1 | 6/2014 | Grigg et al. |
| 2014/0214615 A1 | 7/2014 | Greystoke |
| 2014/0278897 A1 | 9/2014 | Grigg et al. |
| 2014/0279505 A1 | 9/2014 | Grigg et al. |
| 2014/0310159 A1 | 10/2014 | Zoldi et al. |
| 2014/0330629 A1* | 11/2014 | Beadles ............... G06Q 50/01 |
| | | 705/14.26 |
| 2014/0351374 A1 | 11/2014 | Canoy |
| 2014/0364201 A1 | 12/2014 | Tanibuchi |
| 2015/0095216 A1* | 4/2015 | Van Heerden ......... G06Q 40/02 |
| | | 705/39 |
| 2016/0027102 A1 | 1/2016 | Smith et al. |
| 2016/0132924 A1* | 5/2016 | Thirugnanasundaram ................. |
| | | G06Q 30/0261 |
| | | 705/14.5 |
| 2018/0157725 A1 | 6/2018 | Flynn |

OTHER PUBLICATIONS

STIC EIC 3600 Search Report for U.S. Appl. No. 17/411,471 dated Sep. 20, 2021 (Year: 2021).*
STIC EIC 3600 Search Report for parent U.S. Appl. No. 16/427,009 (similar claims) dated Sep. 14, 2020 (Year: 2020).*
STIC EIC 3600 Search Report for parent U.S. Appl. No. 15/392,594 (similar claims) dated Oct. 3, 2018 (Year: 2018).*
IP.com NPL Search Strategy dated Sep. 10, 2021 (Year: 2021).*
STIC EIC 3600 Search Report for U.S. Appl. No. 16/427,009, dated Sep. 14, 2020 (Year: 2020).
Zhang et al., "To Personalize or Not: A Risk Management Perspective", RecSys '13, Oct. 12-16, 2013, Hong Kong China. 8 pages.
Zhao et al., "Investment Recommendation in P2P Lending: A Portfolio Perspective with Risk Management", 2014 IEEE International Conference on Data Mining. 6 pages.

* cited by examiner

MANAGEMENT OF REWARDS USING TRANSACTION LISTENING

CROSS-REFERENCE TO RELATED PATENT APPLICATIONS

This application is a continuation of U.S. patent application Ser. No. 16/427,009, filed on May 30, 2019, which is a continuation of U.S. patent application Ser. No. 15/392,594, filed on Dec. 28, 2016, now U.S. Pat. No. 10,346,869, both of which are incorporated by reference herein in their entireties.

BACKGROUND

A financial institutions typically awards customers who use financial products and services of the financial institution with various types of rewards to deepen relationships and to incentivize loyalty. For instance, based on certain customer behaviors such as opening a new account or spending above a threshold on a designated credit card, rewards may be given. The reward may represent utility which the customers may appreciate, thus enticing the customers to further use the financial products and services.

SUMMARY

In some arrangements, a method for generating rewards for a customer of a financial institution includes storing first transactions made by the customer in at least one database of a computing system, wherein the first transactions correspond to a first transaction type. The method further includes determining, by a processor of the computing system, a first transaction pattern corresponding to the first transactions. The method further includes determining, by the processor, a first deviation from the first transaction pattern. The method further includes determining, by the processor, a first event associated with the customer based on the first deviation. The method further includes determining, by the processor, a correspondence between rewards to the first event based on a mapping table, wherein the rewards are determined for a second transaction type different from the first transaction type and at least one of a type of the rewards or an amount of the rewards are determined based on the second transaction type.

In some arrangements, a financial institution computing system includes a network interface structured to facilitate data communication via a network, a memory, and a processing circuit comprising a processor. The processing circuit is configured to store first transactions made by the customer in at least one database of a computing system, wherein the first transactions correspond to a first transaction type. The processing circuit is further configured to determine a first transaction pattern corresponding to the first transactions. The processing circuit is further configured to determine a first deviation from the first transaction pattern. The processing circuit is further configured to determine a first event associated with the customer based on the first deviation. The processing circuit is further configured to determine a correspondence between rewards to the first event based on a mapping table, wherein the rewards are determined for a second transaction type different from the first transaction type and at least one of a type of the rewards or an amount of the rewards are determined based on the second transaction type.

In some arrangements, a non-transitory processor-readable medium having processor-readable instructions stored thereon, such that when executed by a processor of a financial institution computing system. The processor is configured to store first transactions made by the customer in at least one database of a computing system, wherein the first transactions correspond to a first transaction type. The processor is further configured to determine a first transaction pattern corresponding to the first transactions. The processor is further configured to determine a first deviation from the first transaction pattern. The processor is further configured to determine a first event associated with the customer based on the first deviation. The processor is further configured to determine a correspondence between rewards to the first event based on a mapping table, wherein the rewards are determined for a second transaction type different from the first transaction type; and at least one of a type of the rewards or an amount of the rewards are determined based on the second transaction type.

These and other features, together with the organization and manner of operation thereof, will become apparent from the following detailed description when taken in conjunction with the accompanying drawings.

DETAILED DESCRIPTION

Figure 1:
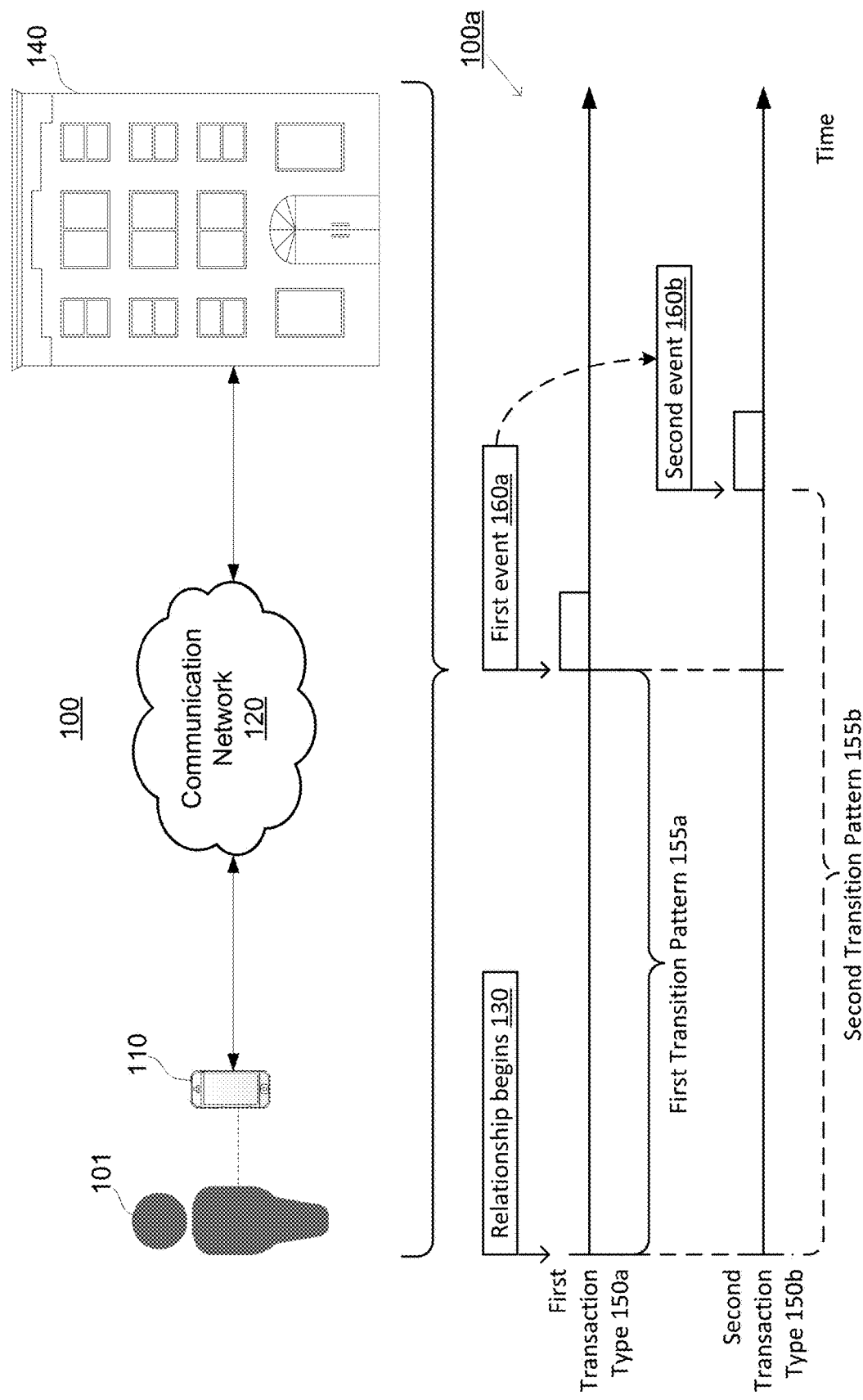
FIG. 1 is a diagram of an example of a system for determining access to a financial account held by a customer of a financial institution according to some arrangements.

Referring generally to the FIGS., a "contextual metaphor" as used herein refers to a condition or situation experienced by a customer that is inferred by a pattern of transactions (and/or by a deviation from the pattern of transactions). A contextual metaphor can be determined using a broader context of transactions over time (e.g., a transaction pattern), due to analyzing the transactions over time grants deeper context information as compared to analyzing only explicit information (e.g., transaction amount, transaction time, other party in the transaction, or the like) available for each transaction without evaluating the pattern of such transactions as a whole.

The contextual metaphor can correspond to a life event of a customer. That is, a change in an existing transaction pattern with respect to a given transaction type likely indicates a contextual metaphor that corresponds to a life event. Illustrating with a non-limiting example, regular deposits of a same amount on a same date every month to a same checking account is associated with a transaction pattern consistent with a customer is employed. A deviation from such transaction pattern (e.g., including absence of such deposits for one or more month) is associated with a contextual metaphor that the customer is no longer employed.

The contextual metaphor can result in predictable consequences relative to the customer's finances. In particular, the contextual metaphor with respect to a transaction type may cause another contextual metaphor in connection with another transaction type. Illustrating with the non-limiting in which the customer is no longer employed, the customer will likely fail to timely pay for a mortgage on a home due to lack of income. The customer owning a home is associated with a transaction pattern determined using regular monthly payments of the same amount to a mortgage lender. In this case, the deviation from a first transaction pattern likely results in a deviation in a second transaction pattern. For example, the deviation in the first transaction pattern corresponds to a first contextual metaphor indicating unemployment. The deviation in the second transaction pattern corresponds to a second contextual metaphor associated with failure to timely make mortgage payments.

Thus, loyalty rewards (and/or financial products) can be determined for and offered to the customer based on the contextual metaphor to better assist the customer to address such life events. Such rewards may be prescriptive in nature because the rewards are generated to address anticipated consequences resulting from a life event of the customer. Specifically, rewards are designated by the financial institution to assist the customer to mitigate the first contextual metaphor's effects on the second contextual metaphor, as the rewards are associated with the second transaction type. Illustrating with the non-limiting in which the customer is no longer employed (e.g., the first contextual metaphor), the financial institution can issue rewards for allowing the customer to make interest-only payments on the mortgage to prevent default. As such, rewards can be determined by the financial institution upon determination of the deviation from the first transaction pattern of a first transaction type to preemptively mitigate possible adverse effect on the second transaction pattern of a second transaction type.

Accordingly, determining prescriptive rewards using the contextual metaphor paradigm in the manner described herein allow rewards to be personally tailored and responsive to a customer's life event. Customer relations can be deepened by resolving actual issues of the customer as soon as such issues arise. The use of contextual metaphors can provide accurate determination of the life events that need to be addressed due to the fact that the contextual metaphors are grounded in transaction history of the customer, revealing information that is otherwise unknown to the financial institution computing system. By automatically determining such rewards at the financial institution computing system based on transaction history already available to the financial institution computing system (instead of passively receiving notification from the customer), network resources and time are conserved.

In some arrangements, the rewards include a financial product or a modification to a financial product. In some examples, in response to determining a life event (e.g., loss of income), a financial product (e.g., a line of credit) offered by the financial institution is determined to address a likely outcome (e.g., potential failure to pay for mortgage). In some examples, in response to determining a life event, a modification to a financial product (e.g., a mortgage modification such as lowered monthly payments or interest-only payments) offered by the financial institution or another financial institution is determined to address a likely outcome (e.g., potential failure to pay for mortgage).

FIG. 1 is a diagram of an example of a system 100 for determining rewards for a customer 101 of a financial institution 140 according to some arrangements. Referring to FIG. 1, the customer 101 is an account holder of at least one financial account at the financial institution 140. The customer 101 is associated with a user device 110. That is, the customer 101 can use the user device 110 to access financial products and/or services provided by the financial institution 140. Particularly, the customer 101 can make financial transactions (e.g., payments, deposits, or the like) with another party using the user device 110 or via another suitable method.

The user device 110 is connected to the financial institution 140 (e.g., a financial institution computing system 242 of FIG. 2) via a communication network 120. The communication network 120 is any suitable Local Area Network (LAN) or Wide Area Network (WAN). For example, the communication network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The communication network 120 is structured to permit the exchange of data, values, instructions, messages, and the like between the user device 110 and the financial institution 140 (e.g., a financial institution computing system 242 of FIG. 2).

Example interactions between the customer 101 and the financial institution 140 are represented in a diagram 100a. The financial institution 140 facilitates various types of transactions between the customer 101 and other parties, where the types of transactions include a first transaction type 150a and a second transaction type 150b. Examples of the types of transactions include, but not limited to, payroll deposits, mortgage payments, loan payments, babysitter payments, child support, tuition, grocery payments, entertainment payments, and the like. In one example, the first transaction type 150a encompasses payroll deposits to an account (e.g., a saving account, checking account, investment account, or the like) of the customer 101, and the second transaction type 150b encompasses mortgage payments made by the customer 101 to a mortgage lender.

From the moment that the relationship between the customer 101 and the financial institution 140 begins (e.g., at 130), or from another arbitrary moment in time, recurring transactions of a same transaction type form a transaction pattern over time. The transaction pattern can be used to anticipate future transactions that conform to the transaction pattern. Upon determination that an additional transaction conforms with the existing transaction pattern, it can be assumed that the customer 101 has not experienced a life event that can change the existing transaction pattern. The financial institution 140 stores a transaction history including all transactions made by the customer 101. Each transaction is defined by one or more of a transaction amount, transaction time, other party in the transaction, or the like. Based on such knowledge, recurring transactions of a same transaction type can be grouped and analyzed to determine the transaction pattern.

Illustrating with a non-limiting example in which the first transaction type 150a includes payroll deposits, recurring deposits of a same amount (e.g., X amount) on a same day (e.g., the $1^{st}$) each month from a same entity (e.g., a company for whom the customer 101 work) correspond to a first transaction pattern 155a defined by the same parameters. The first transaction pattern 155a can be used to anticipate future deposits of the same amount on the same day each month as long as the customer 101 does not experience a life event that can alter such pattern. In the example in which the second transaction type 150b includes mortgage payments, recurring payment of a same amount (e.g., X amount) on a same day (e.g., the $10^{th}$) each month to a same entity (e.g., a mortgage lender) correspond to a second transaction pattern 155b defined by the same parameters. Similarly, the second transaction pattern 155b can be used to anticipate future payments of the same amount on the same day each month to the mortgage lender as long as the customer 101 does not experience a life event that can alter such pattern.

The customer 101 can experience various life events that can cause deviations to the existing transaction patterns. Examples of such events include, but not limited to, unemployment, relocation, marriage, home ownership, college, health conditions, failure to timely pay a mortgage payment, or the like. Thus, occurrence of life events can be determined by analyzing (e.g., "listening" to) transactions. In some cases, the customer 101 experiences a first event 160a that causes a deviation from the first transaction pattern 155a, leading to termination or interruption of the first transaction pattern 155a. Illustrating with a non-limiting example in which the first transaction type 150a includes payroll deposits, the absence of a deposit on the same day of a month indicates that the customer 101 is experiencing loss of income (e.g., loss of employment), which is the first event 160a. In other words, the combination of the first transaction pattern 155a and the deviation from the first transaction pattern 155a forms a first contextual metaphor that corresponds to the loss of employment.

The first event 160a is likely to cause a second event 160b that affects the second transaction type 150b. In the example in which the first event 160a is the loss of employment, the customer 101 will likely run out of funds to mortgage payments (the second transaction type 150b) soon thereafter. Therefore, if unemployment continues, the customer 101 is likely to experience delayed mortgage payments or default as the second event 160b, also resulting in a deviation from the second transaction pattern 155b. In this sense, the first contextual metaphor determined based on transaction information of the first transaction type 150a can lead to a second contextual metaphor concerning late mortgage payments or default.

Figure 2:
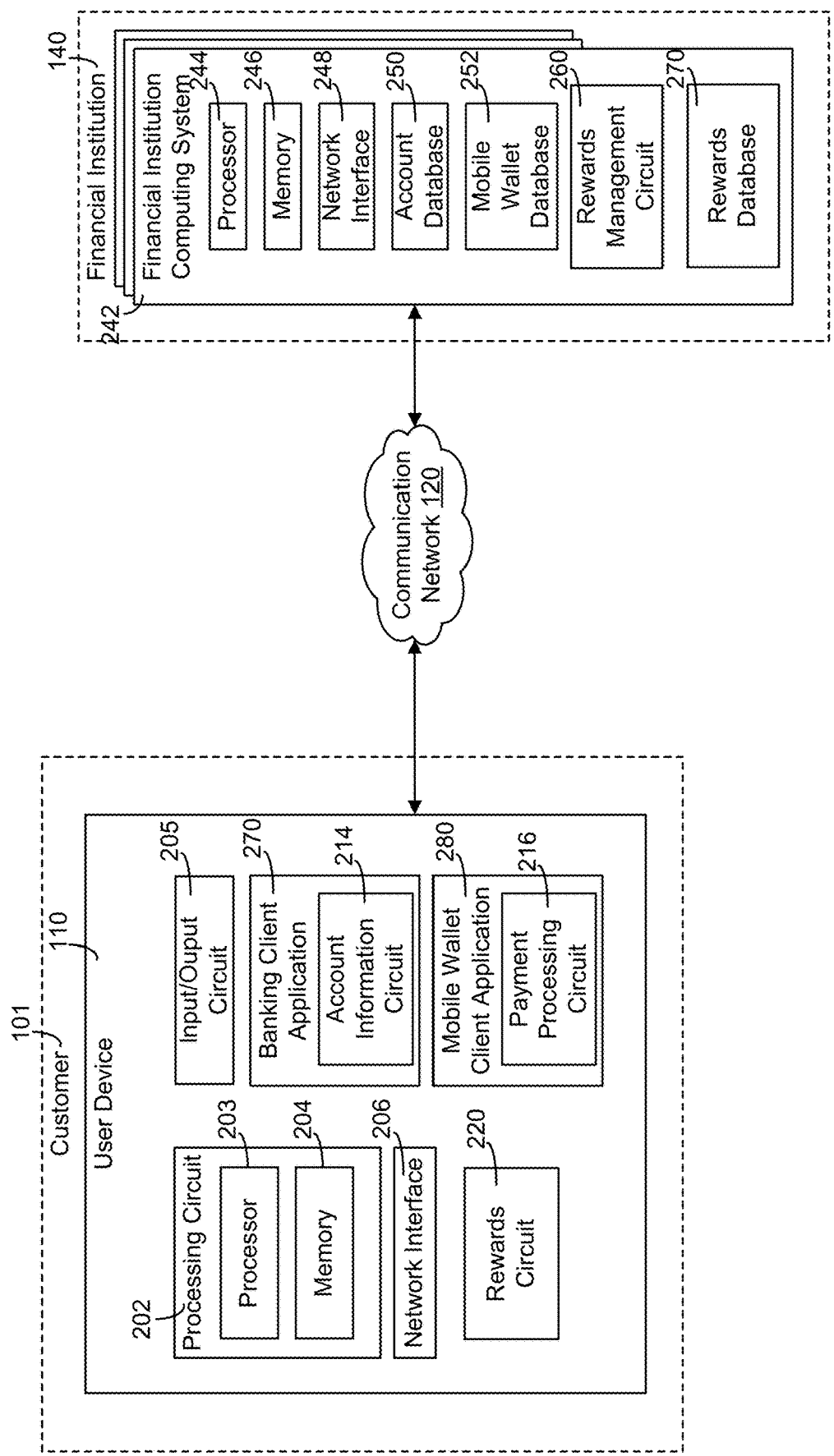
FIG. 2 is a diagram of a user device and a financial institution in the system set forth in FIG. 1 according to some arrangements.

FIG. 2 is a diagram of an example of the user device 110 and an example of the financial institution 140 in the system 100 set forth in FIG. 1 according to some arrangements.

Referring now to FIGS. 1-2, the financial institution 140 includes one or more of a bank branch, loan office, mortgage office, financial services office, retail office, automatic teller machine (ATM) location, a combination thereof, and/or the like. The financial institution 140 has at least one associated financial institution computing system 242.

The financial institution 140 provides financial products and services such as, but not limited to, credit card accounts, checking/saving accounts, retirement accounts, mortgage accounts, loan accounts, investment and financial accounts, and the like to the customer 101 via the financial institution computing system 242. The financial institution computing system 242 includes a processor 244 and a memory device 246. The processor 244 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 246 (e.g., Random Access Memory (RAM), Read-Only Memory (ROM), Non-volatile RAM (NVRAM), Flash Memory, hard disk storage, etc.) stores data and/or computer code for facilitating at least some of the various processes described herein. The memory 246 is or includes tangible, non-transient volatile memory or non-volatile memory. In this regard, the memory 246 stores programming logic that, when executed by the processor 244, controls the operations of the financial institution computing system 242. In some arrangements, the processor 244 and the memory 246 may form various processing circuits described with respect to the financial institution computing system 242 (e.g., the rewards management circuit 260).

As shown, the financial institution computing system 242 includes a network interface 248. The network interface 248 is structured for sending and receiving of data over the communication network 120 (e.g., to and from the user device 110, etc.). Accordingly, the network interface 248 includes any of a cellular transceiver (for cellular standards), local wireless network transceiver (for 802.11X, ZigBee, Bluetooth, Wi-Fi, or the like), wired network interface, combination thereof (e.g., both a cellular transceiver and a Bluetooth transceiver), and/or the like.

The financial institution computing system 242 includes an account database 250 that stores customer information and account information relating to one or more accounts held by the customer 101 with the financial institution 140. In this regard, more than one financial institution (such as, but not limited to, the financial institution 140) with an associated financial institution computing system (such as, but not limited to, the financial institution computing system 242) can be communicably coupled to the components of FIG. 2 over the communication network 120 to access the accounts held by the customer 101. The account database 250 stores transaction history of transactions made by the customer 101 using one or more accounts of the customer 101, for example, with the banking client application 270 or with other suitable methods. The transaction information for each transaction includes one or more of a transaction amount, transaction time, other party in the transaction, or the like.

The financial institution computing system 242 includes a mobile wallets account database 252 for storing mobile wallet accounts of users, including the customer 101. The mobile wallet accounts permit payments via a mobile wallet client application 280 of the user device 110. The mobile wallets account database 252 stores transaction history of transactions made by the customer 101 using the mobile wallet client application 280. The transaction information for each transaction includes one or more of a transaction amount, transaction time, other party in the transaction, or the like.

The financial institution computing system 242 includes a rewards management circuit 260. The rewards management circuit 260 is capable of determining rewards for the customer 101 to address life events of the customer 101. The rewards management circuit 260 is operatively coupled to one or more of the components of the financial institution computing system 242. For example, the rewards management circuit 260 is coupled to the network interface 248 for communicating with the user device 110 via the communication network 120. The rewards management circuit 260 is coupled to one or more of the account database 250 or mobile wallet database 252 to access information stored thereon with respect to the transaction history of the customer 101 to determine various transaction patterns and deviations therefrom. The rewards management circuit 260 can further determine life events implicated by the transaction patterns and the deviations using the contextual metaphor scheme. In some examples, the rewards management circuit 260 is implemented with the processor 244. For example, the rewards management circuit 260 is implemented as a software application stored within the memory 246 and executed by the processor 244. Accordingly, such examples can be implemented with minimal or no additional hardware costs. However, other implementations rely on dedicated hardware specifically configured for performing operations of the rewards management circuit 260.

In some arrangements, the financial institution computing system 242 includes the rewards database 270. The rewards database 270 is capable of storing and managing rewards information of customers of the financial institution 140, including the customer 101. In this regard, "rewards" refer to reward points, cash back, redemption, or the like earned by the customer 101 in the course of dealing with the financial institution 140. Rewards may be earned through various activities of the customer 101 including, but not limited to, creating or otherwise opening an account (checking, saving, credit, investment, retirement, and/or the like), depositing funds, borrowing, improving security of an account, financing, retiring, investing, spending, creating a financial plan, a combination thereof, and/or the like. In particular arrangements, rewards can be earned by the customer through making transactions using the banking client application 270 and/or mobile wallet client application 280 on the user device 110a. The processor 244 can determine the rewards based on transaction activities stored in one or more of the account database 250 or mobile wallet database 252. The processor 244 can store the rewards in the rewards database 270.

As shown, the customer 101 operates or is associated with the user device 110. In some arrangements, the user device 110 includes a processing circuit 202 having a processor 203 and memory 204. The processor 203 is implemented as a general-purpose processor, an ASIC, one or more FPGAs, a DSP, a group of processing components that are distributed over various geographic locations or housed in a single location or device, or other suitable electronic processing components. The memory 204 (e.g., RAM, NVRAM, ROM, Flash Memory, hard disk storage, etc.) stores data and/or computer code for facilitating the various processes described herein. Moreover, the memory 204 is or includes tangible, non-transient volatile memory or non-volatile memory. Accordingly, the memory 204 includes database components, object code components, script components, or any other type of information structure for supporting the various activities and information structures described herein.

The user device 110 is shown to include various circuits and logic for implementing the activities described herein. More particularly, the user device 110 includes one or more of a processing circuit 202, input/output circuit 205, network interface 206, rewards circuit 220, banking client application 270, mobile wallet client application 280, or the like. While various circuits, interfaces, and logic with particular functionality are shown, it should be understood that the user device 110 includes any number of circuits, interfaces, and logic for facilitating the functions described herein. For example, the activities of multiple circuits are combined as a single circuit and implemented on a same processing circuit (e.g., the processing circuit 202), as additional circuits with additional functionality are included, etc.

The network interface 206 is configured for and structured to establish a communication session via the communication network 120 with the financial computing system 242. Accordingly, the network interface 206 is an interface such as, but not limited to, the network interface 248.

The input/output circuit 205 is configured to receive user input from and provide information to the customer 101. In this regard, the input/output circuit 205 is structured to exchange data, communications, instructions, etc. with an input/output component of the user device 110. Accordingly, in some arrangements, the input/output circuit 205 includes an input/output device such as a display device, touchscreen, keyboard, microphone, and/or the like. In some arrangements, the input/output circuit 205 includes communication circuitry for facilitating the exchange of data, values, messages, and the like between the input/output device and the components of the user device 110. In some arrangements, the input/output circuit 205 includes machine-readable media for facilitating the exchange of information between the input/output device and the components of the user device 110. In still another arrangement, the input/output circuit 205 includes any combination of hardware components (e.g., a touchscreen), communication circuitry, and machine-readable media.

One or more of the banking client application 270 or mobile wallet client application 280 are server-based applications executable on the user device 110. In this regard, the customer 101 has to first download the application(s) prior to usage. In another arrangement, the banking client application 270 and/or mobile wallet client application 280 are coded into the memory 204 of the user device 110. In still another arrangement, the banking client application 270 and/or mobile wallet client application 280 are web-based interface applications. In this configuration, the customer 101 has to log onto or access the web-based interface before usage. In this regard, at least one of the banking client application 270 and mobile wallet client application 280 is supported by a separate computing system comprising one or more servers, processors, network interface modules, etc. that transmit the applications for use to the user device 110. In certain arrangements, one or more of the banking client application 270 and/or mobile wallet client application 280 include an Application Programming Interface (API) and/or a Software Development Kit (SDK) that facilitate integration of other applications. All such variations and combinations are intended to fall within the spirit and scope of the present disclosure.

The banking client application 270 is communicably coupled to the financial institution computing system 242 (e.g., the account database 250) via the network 202 and is structured to permit management of at least one account of the customer 101 via the banking client application 270. In this regard, the banking client application 270 provides displays indicative of account information such as, but not limited to, current account balances, pending transactions, profile information (e.g., contact information), reward associated with the account, bill pay information and/or the like. Further, in some arrangements, the banking client application 270 is configured to process payments from the customer 101 to a designated recipient. For example, the banking client application 270 depicts a loan (e.g., mortgage) of the customer 101 and allows the customer 101 to pay the loan from an account (e.g., checking or savings). In some examples, a bill pay option is provided by the banking client application 270, where the bill pay option allows the customer 101 to pay his/her bills in response to user input.

As mentioned herein, via the banking client application 270, the customer 101 pays bills (e.g., mortgage, etc.), view balances, and otherwise manage their account. Accordingly and as shown, the mobile bank client application 270 includes an account information circuit 214. The account information circuit 214 is linked or otherwise coupled to one or more accounts (as stored the account database 250) held by the customer 101 and permit management of the associated accounts (e.g., transfer balances between accounts, see payment history, etc.) by communicating with the financial institution computing system 242. The banking client application 270 is communicably coupled to the mobile wallet client application 280. As such, in response to a mobile payment via the mobile wallet client application 280, the mobile wallet client application 280 causes the banking client application 270 to update the payment account (i.e., the account that supported the mobile payment). As such, the applications 270 and 280 are communicably coupled to each other to enable actions supported by each respective application in some examples.

The mobile wallet client application 280 is communicably coupled to the financial institution computing system 242 (e.g., the mobile wallets database 252) via the communication network 120 and is structured to facilitate purchases by the customer 101 via the mobile wallet client application 280. Accordingly, the mobile wallet client application 280 is linked or otherwise connected with one or more accounts (as stored the account database 250) of the customer 101. In operation, when at a point-of-sale terminal, the customer 101 initiates the mobile wallet client application 280 and provides a passcode (e.g., biometrics such as a thumbprint, a Personal Identification Number (PIN), a password, etc.) to authenticate the customer 101 and select the source payment account desired (e.g., a checking account from a particular financial institution that is linked to the mobile wallet client application 280). Via communication with the payment terminal (e.g., via near field communication), the aforementioned payment information is provided to the point-of-sale terminal or the merchant (e.g., via NFC, via barcode presentment, etc.) and the payment processed. Beneficially, carrying payment cards are avoided or reduced via the mobile wallet client application 280.

As mentioned herein, the mobile wallet client application 280 is structured to facilitate and permit payments by interfacing with an account held by the customer 101 at the financial institution 140. Accordingly, the mobile wallet client application 280 is communicably coupled via the network interface 206 over the communication network 120 to the financial institution computing system 242. As shown, the mobile wallet client application 280 includes a payment processing circuit 216 structured to facilitate payments by the customer 101 via the mobile wallet client application 280. For example, the payment processing circuit 216 enables a quick-pay capability with a merchant. In this regard, the payment processing circuit 216 includes or be communicably coupled with a communication device (e.g., a near-field communication chip) that facilitates the exchange of information between the mobile wallet client application 280 and a point-of-sale terminal.

In some arrangements, the user device 110 includes a rewards circuit 220. The rewards circuit 220 is operatively coupled to one or more of the components of the user device 110. For example, the rewards management circuit 260 is coupled to the network interface 206 for communicating rewards information with the financial institution computing system 242 via the communication network 120. In some examples, the rewards circuit 220 is coupled to the input/output circuit 205 to display information concerning the rewards to the customer 101 and to receive user input via the input/output circuit 205 to relative to selection of one or more rewards presented.

Figure 3:
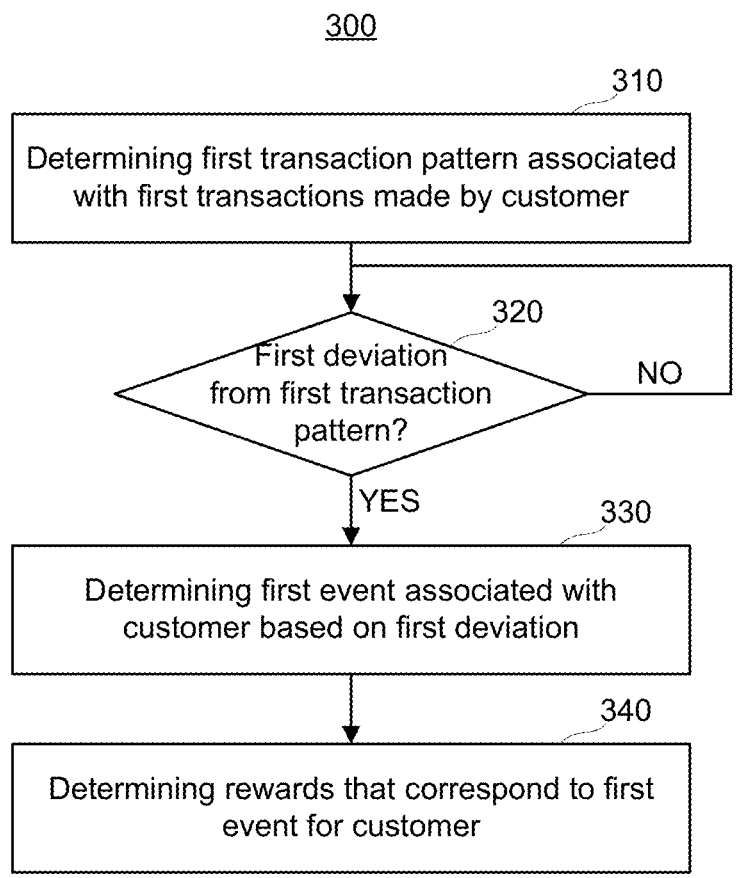
FIG. 3 is a flow diagram illustrating a method for determining rewards according to various arrangements.

FIG. 3 is a flow diagram illustrating a method 300 for determining rewards according to various arrangements. Referring to FIGS. 1-3, the method 300 is generally concerned with the financial institution computing system 242 (e.g., the rewards management circuit 260) determining rewards for the customer 101 to address a life event (e.g., a first event) experienced by the customer 101. The life event is determined by detecting a deviation (e.g., a first deviation) from a transaction pattern (e.g., a first transaction pattern), where the deviation indicates a departure from a financial practice of the customer 101 established over time.

At 310, the rewards management circuit 260 determines the first transaction pattern associated with first transactions made by the customer 101. Information relative to transactions made by the customer 101 (including the first transactions) is stored in one or more of the account database 250 or mobile wallet database 252 as described herein. The information relative to the first transactions includes one or more of a transaction amount, transaction time, or another part to the transaction with respect to each first transaction. In some arrangements, the information is gathered over a threshold period of time (e.g., a month, six months, a year, etc.) before enough information is gathered to make a determination that the first transaction pattern exists.

In some examples, the first transactions are recurring transactions of a same transaction type. Recurring transactions refer to transactions associated with one or more of a same or similar transaction amount, a consistent time scheme (e.g., periodic time scheme, such as daily, weekly, bimonthly, monthly, semiannually, quarterly, annually, or the like), same parties to the transaction, or the like. The transaction type associated with recurring transactions indicates a purpose or nature of these recurring transactions. Examples of the types of transactions include, but not limited to, payroll deposits, mortgage payments, loan payments, babysitter payments, child support, tuition, grocery payments, entertainment payments, and the like. The first transaction pattern includes details (e.g., transaction amount, transaction time, or another part to the transaction) of the recurring nature of the first transactions and can be used to predict one or more future transactions associated with one or more of the transaction amount, transaction time, or parties to the transaction.

At 320, the rewards management circuit 260 determines whether a first deviation from the first transaction pattern is detected. In some examples, the first deviation is detected by determining absence of one or more new transactions of the first transaction type predictable by the first transaction pattern. The absence of the new transaction(s) indicates that the customer 101 is unable to continue the transaction pattern due to a life event.

In alternative examples, the first deviation is detected in response to detecting a new transaction (of the first transaction type) defined by one or more of a new party to the transaction different from the part indicated by the first transaction pattern, a new transaction amount different from the transaction amount indicated by the first transaction pattern, or a new transaction time different from the transaction time indicated by the first transaction pattern. In particular, the new party is different from that indicated by the first transaction pattern in response to determining that the new party is different from the party associated with one or more of the first transactions. The transaction amount is different from that indicated by the first transaction pattern in response to determining that the transaction amount of the new transaction is different from the transaction amount of one or more of the first transactions. The transaction time of the new transaction is different from that indicated by the first transaction pattern in response to determining the transaction time of the new transaction is inconsistent with the periodicity (e.g., the recurring pattern) indicated by the first transaction pattern.

In some examples, a transaction is determined to be of the first transaction type in response to determining one or more of the transaction is made with the same party as the one indicated by the first transaction pattern, the transaction is made at a time consistent with the first transaction pattern, or the transaction concerns a same amount as indicated by the first transaction pattern.

If a first deviation is determined at 310, at 330, the rewards management circuit 260 determines a first event associated with the customer based on the first deviation 330. Examples of the first event include, but not limited to, unemployment, relocation, marriage, home ownership, college, health conditions, failure to timely pay a mortgage payment, or the like. For a transaction type related to deposits (e.g., payroll), absence of transactions that follow the same transaction pattern indicates loss of employment. For a transaction type related to payments (e.g., loan payments, mortgage payments, child support, or the like), absence of transactions that follow the same transaction pattern indicates inadequate financial resources to meet parodic payment deadlines.

At 340, the rewards management circuit 260 determines rewards that correspond to the first event for the customer 101. With respect to each transaction type, a correspondence between possible events and resulting rewards is determined (e.g., in the form of a mapping table) and stored in the memory 246. The rewards management circuit 260 determines the rewards based on such correspondence in response to determining the actual life event (e.g., the first event). In some arrangements, the rewards are associated with a transaction type (e.g., a second transaction type) different from the first transaction type.

Figure 4:
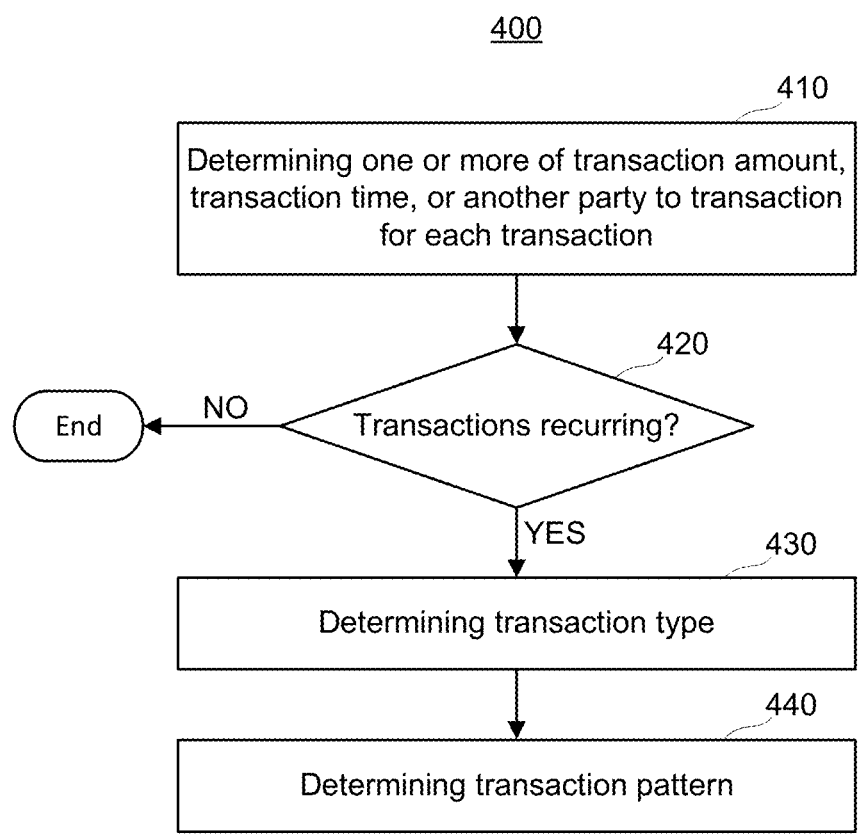
FIG. 4 is a flow diagram illustrating a method for determining a transaction pattern according to various arrangements.

FIG. 4 is a flow diagram illustrating a method 400 for determining a transaction pattern according to various arrangements. Referring to FIGS. 1-4, the method 400 is generally concerned with the financial institution computing system 242 (e.g., the rewards management circuit 260) analyzing previous transactions (e.g., the first transactions) made by the customer 101 to determine a transaction pattern for predicting future transactions of the same type. As described, deviations from the transaction pattern can implicate a life event. The method 400 is an example implementation of block 310.

At 410, the rewards management circuit 260 determines one or more of a transaction amount, transaction time, or another party (e.g., the party other than the customer 101) to the transaction for each transaction that the customer 101 made. Such transaction information is stored in one or more of the account database 250, mobile wallet database 252, or memory 246. The transaction information can be stored in a manner as shown in FIGS. 5A and 5B.

Figure 5A:
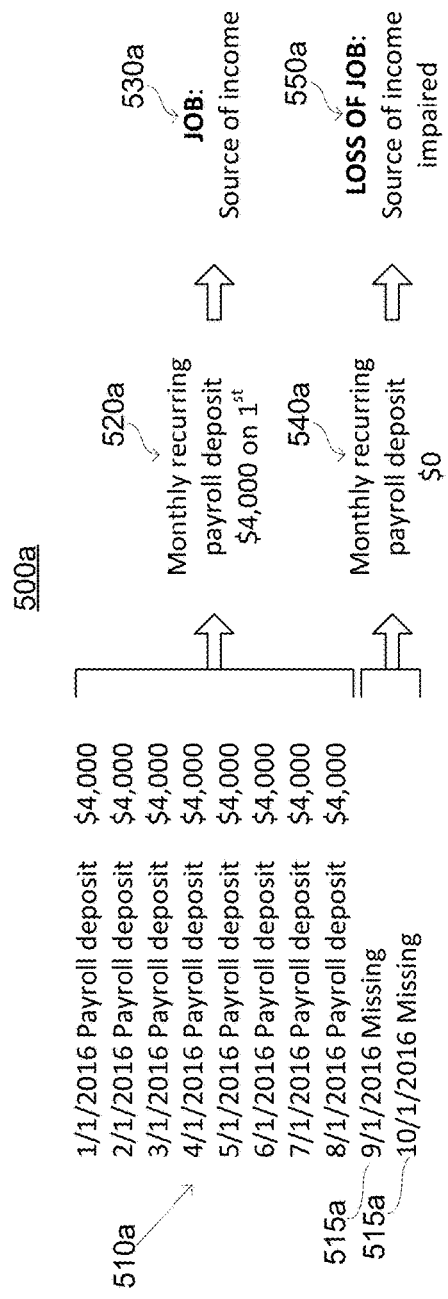
FIG. 5A is a diagram illustrating transactions that follow a transaction pattern according to some examples.
Figure 5B:
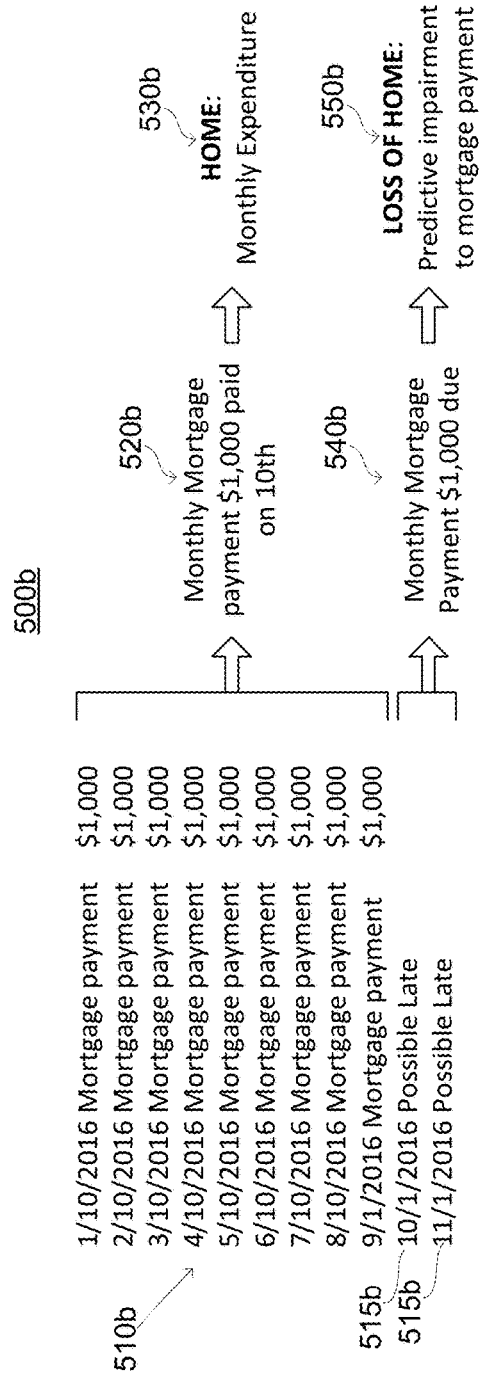
FIG. 5B is a diagram illustrating transactions that follow a transaction pattern according to some examples.

FIG. 5A is a diagram illustrating transactions 510a that follow a transaction pattern 520a according to some examples. FIG. 5B is a diagram illustrating transactions 510b that follow a transaction pattern 520b according to some examples. Referring to FIGS. 1-5B, transactions 510a are each defined by a transaction time (e.g., the $1^{st}$ of each month), transaction party (e.g., from an enterprise payroll entity), and transaction amount (e.g., $4,000). The transactions 510a are deposits in nature. Transactions 510b are each defined by a transaction time (e.g., the $10^{th}$ of each month), transaction party (e.g., to a mortgage lender), and transaction amount (e.g., $1,000). The transactions 510b are payments in nature. The transactions 510a and 510b may be stored in a data table format as transaction history.

At 420, the rewards management circuit 260 determines whether some transactions are recurring. As described, the rewards management circuit 260 determines that some transactions are recurring in response to determining that such transactions are associated with one or more of a same or similar transaction amount, a consistent time scheme (e.g., periodic time scheme, such as daily, weekly, bimonthly, monthly, semiannually, quarterly, annually, or the like), same parties to the transaction, or the like. Similar transaction amounts refer to transaction amounts that are within a predetermined range of tolerance (e.g., a first amount is within 1%, 5%, 10%, or the like of a second amount).

For instance, each of the transactions 510a is for the same amount (e.g., $4,000), from the same party (e.g., the enterprise payroll entity), and the transactions 510a form a periodic scheme (e.g., a monthly scheme) with a predictable transaction time (e.g., the $1^{st}$ of every month). In another example, each of the transactions 510b is for the same amount (e.g., $1,000), to the same party (e.g., the mortgage lender), and the transactions 510b form a periodic scheme (e.g., a monthly scheme) with a predictable transaction time (e.g., the $10^{th}$ of every month).

In response to determining that the transactions are not recurring (420:NO), the method 400 ends. On the other hand, in response to determining some transactions (e.g., the transactions 510a, the transactions 510b, and/or the like) are recurring (420:YES), the rewards management circuit 260 determines a transaction type for such recurring transactions at 430. The transaction type is determined based on one or more of the transaction amount, transaction time, or parties to the transaction. The transactions 510a are categorized as income/payroll transactions given that the transactions 510a are from a same entity (e.g., the enterprise payroll entity). The transactions 510b are categorized as mortgage payments given that the transactions 510b are from a same entity (e.g., the mortgage lender). Block 430 may be optional in some arrangements.

At 440, the rewards management circuit 260 determines a transaction pattern associated with the recurring transactions of the same transaction type. The transaction pattern identifies similarities in one or more of the transaction time, transaction amount, or transaction parties that can be used to anticipate future transactions. Illustrating with a non-limiting example, a transaction pattern 520a associated with the transactions 510a defines transactions that recur monthly (on the 1$^{st}$ of every month) in the amount of $4,000 from the enterprise payroll entity. The transaction pattern 520a is associated with the income/payroll transaction type. Illustrating with another non-limiting example, a transaction pattern 520b associated with the transactions 510b defines transactions that recur monthly (on the 10$^{th}$ of every month) in the amount of $1,000 to the mortgage lender. The transaction pattern 520b is associated with the mortgage transaction type.

Figure 6:
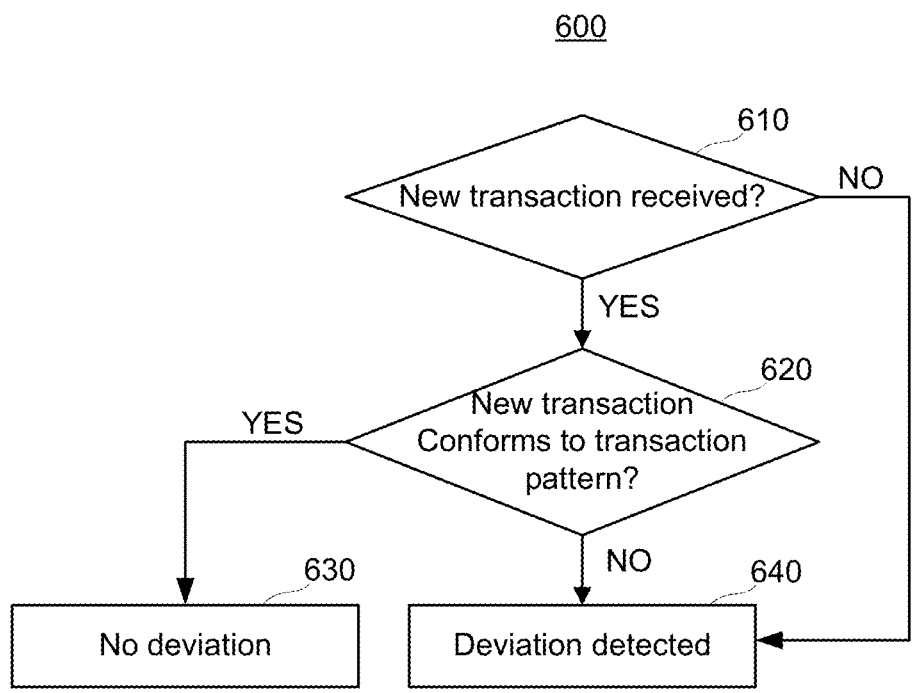
FIG. 6 is a flow diagram illustrating a method for detecting deviations from a transaction pattern according to various arrangements.

FIG. 6 is a flow diagram illustrating a method 600 for detecting deviation from a transaction pattern according to various arrangements. Referring to FIGS. 1-6, the method 600 is generally concerned with the financial institution computing system 242 (e.g., the rewards management circuit 260) determining deviation from an established financial practice (e.g., the transaction pattern) of the customer 101. The life event is determined by detecting a deviation (e.g., a first deviation) from a transaction pattern (e.g., a first transaction pattern), where the deviation indicates a departure from a financial practice of the customer 101 established over time. The method 600 is an example implementation of block 320.

At 610, the rewards management circuit 260 determines whether a new transaction in accordance with the transaction pattern is received timely. Particularly, a new transaction is deemed to have been received timely in response to determining that a new transaction associated with a same transaction amount or with a same party has occurred on or within a predetermined duration of time (e.g., a period, 2 periods, or the like) of the day on which the new transaction is anticipated to be received. Turning to the non-limiting example shown in FIG. 5A, the transaction pattern 520a indicates that new transactions are to be received on the 1$^{st}$ of each month to be consistent with the transaction pattern 520a. However, the anticipated new transactions are not received (610:NO). For example, no new transaction is received on Sep. 1, 2016, or within a period (e.g., a month) from that day. In response to determining that at least one new transaction according to a given transaction pattern is not received (610:NO), the deviation is detected at 640.

On the other hand, in response to determining that anticipated new transactions are received (610:YES), the rewards management circuit 260 determines whether the new transaction conforms to the transaction pattern, at 620. The new transaction fails to conform to the transaction pattern in response to determining that one or more of the transaction time, transaction amount, or transaction party is different from those indicated by the transaction pattern. In response to determining that the new transaction conforms to the transaction pattern (620:YES), no deviation is detected (630).

On the other hand, in response to determining that the new transaction fails to conform to the transaction pattern (620:NO), deviation is detected (640). For example, the deviation from the transaction pattern 520a refers to a shift from a first contextual metaphor 530a of having a source of income to a second contextual metaphor 550a of having the source of income impaired. A new transaction pattern 540a is formed based on absent deposit 515a.

Figure 7:
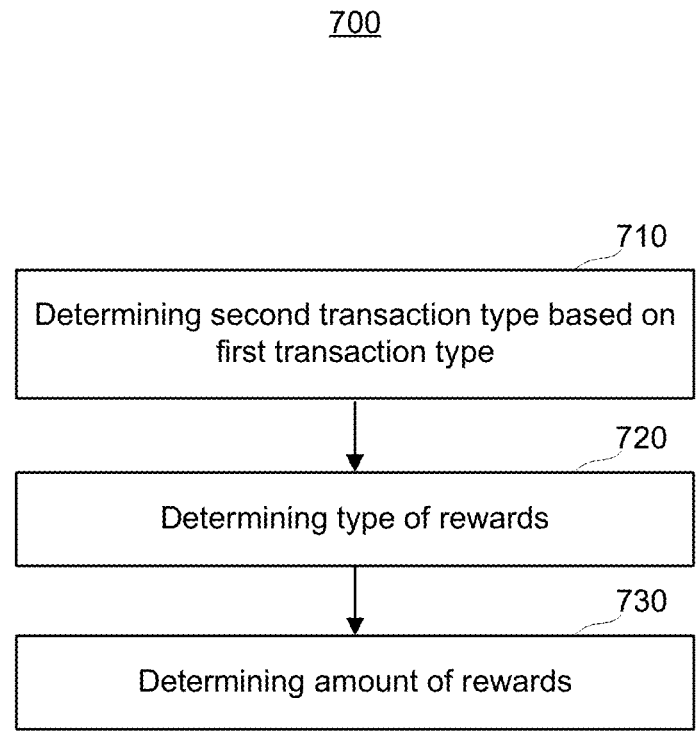
FIG. 7 is a flow diagram illustrating a method for determining rewards according to various arrangements.

FIG. 7 is a flow diagram illustrating a method 700 for determining rewards according to various arrangements. Referring to FIGS. 1-7, the method 700 is generally concerned with the financial institution computing system 242 (e.g., the rewards management circuit 260) dynamically determining rewards for the customer 101 in response to the life event experienced by the customer 101. The method 700 is an example implementation of block 340.

At 710, the rewards management circuit 260 determines a second transaction type based on the first transaction type. A mapping table or a lookup table stored in the memory 246 is used to indicate correspondence between different transaction types and the manner in which one affects another. For instance, the transaction type associated with the transactions 510a is income. In some arrangements, a deviation from an income transaction type can affect all payment transaction types (including the transaction type associated with the transactions 510b), given that the customer 101 has less financial resources available to make payments.

In some examples, the rewards management circuit 260 determines a second event associated with the second transaction type based on the first event associated with the first transaction type. Illustrating with a non-limiting example in which the deviation in FIG. 5A is caused by a first event (e.g., loss of employment), the first event can result in delayed or absent payments, which can be referred to as the second event. For instance, the absent deposit 515a can cause possible late mortgage payments 515b, which can lead a shift from a third contextual metaphor 530b of being able to make the monthly expenditure to a fourth contextual metaphor 550b of having the ability of making such expenditure impaired. It can be predicted that a possible, new transaction pattern 540b will form based on the possible late mortgage payments 515b.

Figure 8:
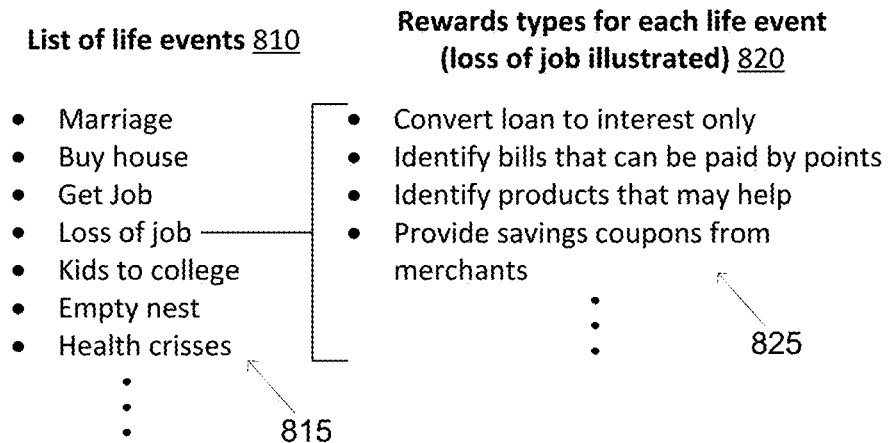
FIG. 8 is a table illustrating correspondence between life events and rewards in some arrangements.

At 720, the rewards management circuit 260 determines at least one type of rewards to be prescribed to the customer 101. As described, the type of rewards is associated with a second transaction type different from the first transaction type. The correspondence between the first event and the rewards can be determined using a mapping table or a lookup table, a non-limiting example of which is shown in FIG. 8. Each life event 815 listed in column 810 corresponds to set of one or more types of rewards 825 (for instance, listed in column 820). For example, loss of job corresponds to converting loan payments to interest-only payments, identifying bills that can be paid by reward points, identifying financial products to assist in finances, providing savings coupons for merchants, etc.

In some arrangements, the type of rewards is determined based on the second transactions (e.g., the transactions 510b). For example, in response to determining that the transactions 510b belong to the mortgage payment transaction type, the rewards management circuit 260 determines types of rewards that can assist in loan payments such that additional payments are not absent or late. In particular, converting mortgage payments to interest-only payments allow the customer 101 to continue making mortgage payments of a lower amount consistent with the time structure indicated by the transaction pattern 520b.

At 730, the rewards management circuit 260 determines an amount of rewards. In some arrangements, the amount of the rewards can be determined based on the transactions of the second transaction type. Illustrating with a non-limiting example, the amount of loan payments corresponding the transactions 510b can be used as a basis for offering rewards to the customer 101. Particular, the amount of the reward points that can be used to pay for the mortgage payments can be calculated as a percentage (e.g., 20%, 50%, 100%, or the like) of the amount (e.g., $1,000) for each of the transactions 510b. In some arrangements, the amount of the rewards is determined based on need of the customer 101. That is, the amount of the rewards to be applied to the second transaction type is determined based on the amount of deviation occurred with respect to the transaction pattern of the first transaction type. Illustrating with a non-limiting example regarding the transaction pattern 520*a*, the deviation corresponds to a loss of $4,000 per month. To sufficiently address this need, the rewards management circuit 260 determines allows the customer 101 to pay for a portion of the monthly mortgage payment with reward points equal to a percentage (e.g., 5%, 10%, 20%, 50%, or the like) of the $4,000.

Figure 9:
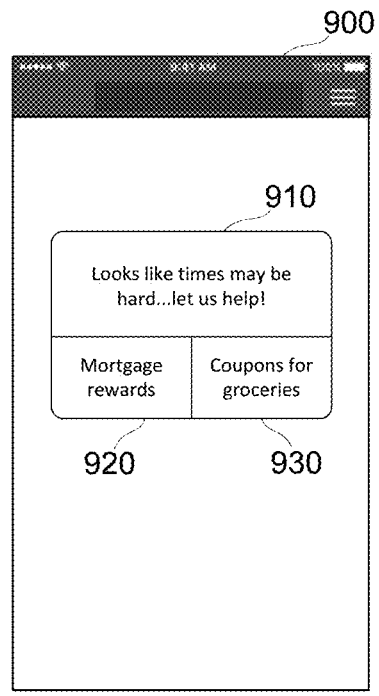
FIG. 9 is an interface display diagram illustrating an interactive interface for receiving user selection of prescribed rewards according to some arrangements.

In some arrangements, the rewards management circuit 260 configures the network interface 248 to send to the user device 110 an offer to select one or more of the rewards to be displayed to the customer 101 using the input/output circuit 205. To that regard, FIG. 9 is an interface display diagram illustrating an interactive interface 900 for receiving user selection of one or more prescribed rewards according to some arrangements. The rewards circuit 220 configures the network interface 206 to receive the offers from the financial institution computing system 242 over the communication network 120. The rewards circuit 220 configures the input/output circuit 205 to display the interactive interface 900 to the customer 101 for selection. The interactive interface 900 includes a message 910 that indicates background of the offer and at least one reward option. The reward options (e.g., mortgage reward option and coupon option) may be configured as user interactive elements 920 and 930 such that, when selected, causes the rewards circuit 220 to send the user input (e.g., in an acceptance message indicating the selection) over the communication network 120 to the financial institution computing system 242.

The rewards management circuit 260 can accordingly issue such rewards. For example, the rewards management circuit 260 can apply the selected rewards to one or more financial accounts of the customer 101 relative to the second transaction type. In response to receiving an acceptance message indicating that the customer 101 has selected mortgage rewards that allow the customer 101 to make interest-only payments, the rewards management circuit 260 accordingly modifies the amount of mortgage to be paid each month accordingly. With respect to loans in which modifications are not available, store coupons or merchant discounts may be offered to the customer 101 in a similar manner.

Figure 10:
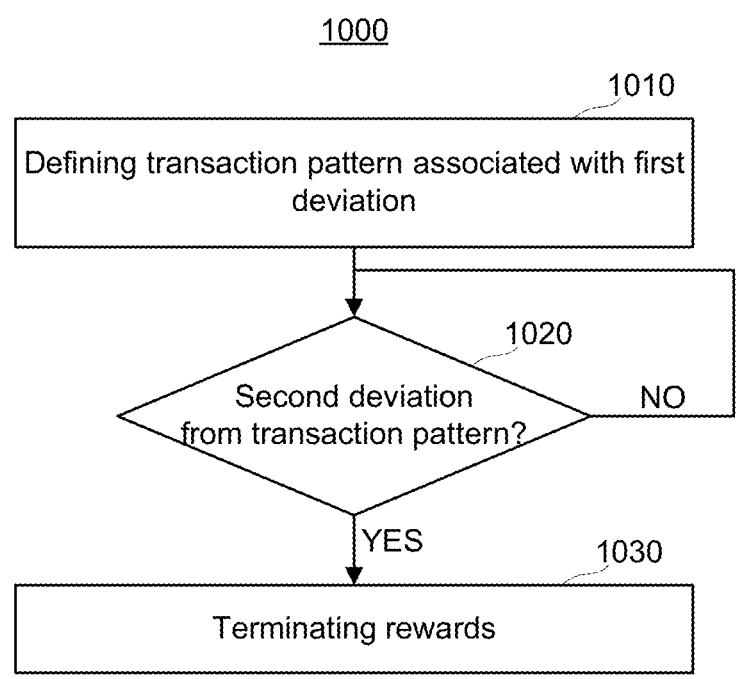
FIG. 10 is a flow diagram illustrating a method for removing rewards according to various arrangements.

In some arrangements, the rewards are applied until the deviation in the first transaction pattern (e.g., the transaction pattern 520*a*) has been remedied. That is, the rewards are no longer offered or applied when the circumstances of the customer 101 changes such that the rewards are no longer necessary. To that regard, FIG. 10 is a flow diagram illustrating a method 1000 for removing rewards according to various arrangements. Referring to FIGS. 1-10, the rewards management circuit 260 determines a transaction pattern associated with the first deviation, at 1010. Illustrating with the non-limiting example shown in FIG. 5A, the new transaction pattern 540*a* is determined based on the absent deposits 515*a*, which is the first deviation from the transaction pattern 520*a* in the manner described.

At 1020, the rewards management circuit 260 determines whether a second deviation from the such transaction pattern has been detected. The detection of the second deviation is implemented in a manner similar to described with respect to the first deviation. In response to determining that second deviation has not been detected (1020:NO), the method 1000 ends and the rewards are applied. In response to determining that second deviation has been detected (1020: YES), the rewards management circuit 260 terminates the reward.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for generating rewards for a customer, the method comprising:
   storing first transactions made by the customer in at least one database of a computing system, wherein the first transactions correspond to a first transaction type;
   determining, by a processor of the computing system, a first transaction pattern corresponding to the first transactions;
   generating, by the processor, a future transaction prediction corresponding to the first transaction pattern;
   receiving, by the processor, at least one additional transaction;
   determining, by the processor, a first deviation from the first transaction pattern based on the future transaction prediction and the at least one additional transaction;
   determining, by the processor, a first event associated with the customer based on the first deviation;
   determining, by the processor, a correspondence between rewards to the first event based on a mapping table, wherein:
      the rewards are determined for a second transaction type different from the first transaction type; and
      at least one of a type of the rewards or an amount of the rewards are determined based on the second transaction type; and
   sending, to a user device of the customer, an offer to the customer to select one or more of the rewards to be displayed at a user interface of the user device.

2. The method of claim 1, wherein the first event comprises at least one of:
   a loss of job;
   a marriage;
   a home purchase; and
   a health crisis.

3. The method of claim 1, wherein the rewards comprise at least one of:
   converting loan payments to interest-only payments;
   identifying bills to be paid by reward points;
   identifying financial products to assist in finances; and
   providing savings coupons for merchants.

4. The method of claim 1, further comprising: receiving, by the computing system from the user device, an acceptance message indicating selection of the one or more of the rewards by the customer; and applying the one or more of the rewards to one or more new transactions in response to receiving the acceptance message.

5. The method of claim 1, wherein the mapping table is stored in a memory of the computing system.

6. The method of claim 1, wherein information defining each of the first transactions comprises one or more of a transaction amount, transaction time, or another party to the transaction.

7. The method of claim 6, wherein determining the first transaction pattern corresponding to the first transactions comprises determining that the first transactions are recurring transactions over time based on the information defining each of the first transactions.

8. The method of claim 6, further comprising determining the first transaction type corresponding to the first transactions based on the information defining each of the first transactions.

9. A computing system, comprising:
  a network interface structured to facilitate data communication via a network;
  a memory; and
  a processing circuit comprising a processor, the processing circuit configured to:
    store first transactions made by a customer in at least one database of the computing system, wherein the first transactions correspond to a first transaction type;
    determine a first transaction pattern corresponding to the first transactions;
    generate a future transaction prediction corresponding to the first transaction pattern;
    receive at least one additional transaction;
    determine a first deviation from the first transaction pattern based on the future transaction prediction and the at least one additional transaction;
    determine a first event associated with the customer based on the first deviation;
    determine a correspondence between rewards to the first event based on a mapping table, wherein:
      the rewards are determined for a second transaction type different from the first transaction type; and
      at least one of a type of the rewards or an amount of the rewards are determined based on the second transaction type; and
    send, to a user device of the customer, an offer to select one or more rewards to be displayed at a user interface of the user device.

10. The computing system of claim 9, wherein information defining each of the first transactions comprises one or more of a transaction amount, transaction time, or another party to the transaction.

11. The computing system of claim 10, wherein determining the first transaction pattern corresponding to the first transactions comprises determining that the first transactions are recurring transactions over time based on the information defining each of the first transactions.

12. The computing system of claim 11, further comprises determining the first transaction type corresponding to the first transactions based on the information defining each of the first transactions.

13. A non-transitory processor-readable medium having processor-readable instructions stored thereon, such that when executed by a processor of a computing system, the processor is configured to:
  store first transactions made by a customer in at least one database of the computing system, wherein the first transactions correspond to a first transaction type;
  determine a first transaction pattern corresponding to the first transactions;
  generate a future transaction prediction corresponding to the first transaction pattern;
  receive at least one additional transaction;
  determine a first deviation from the first transaction pattern;
  determine a first event associated with the customer based on the first deviation;
  determine a correspondence between rewards to the first event based on a mapping table,
  wherein:
    the rewards are determined for a second transaction type different from the first transaction type; and
    at least one of a type of the rewards or an amount of the rewards are determined based on the second transaction type; and
  send, to a use device of the customer, an offer to the customer to select one or more of the rewards to be displayed at a user interface of the user device.

14. The non-transitory processor-readable medium of claim 13, wherein the first event comprises at least one of:
  a loss of job;
  a marriage;
  a home purchase; and
  a health crisis.

15. The non-transitory processor-readable medium of claim 13, wherein the rewards comprise at least one of:
  converting loan payments to interest-only payments;
  identifying bills to be paid by reward points;
  identifying financial products to assist in finances; and
  providing savings coupons for merchants.

16. The non-transitory processor-readable medium of claim 13, wherein information defining each of the first transactions comprises one or more of a transaction amount, transaction time, or another party to the transaction.

17. The non-transitory processor-readable medium of claim 16, wherein determining the first transaction pattern corresponding to the first transactions comprises determining that the first transactions are recurring transactions over time based on the information defining each of the first transactions.

18. The non-transitory processor-readable medium of claim 16, further comprising determining the first transaction type corresponding to the first transactions based on the information defining each of the first transactions.

19. The non-transitory processor-readable medium of claim 13, wherein the mapping table is stored in a memory of the computing system.

\* \* \* \* \*